United States Patent
Lee et al.

(10) Patent No.: US 7,419,145 B2
(45) Date of Patent: Sep. 2, 2008

(54) FRICTION DAMPER

(76) Inventors: George C. Lee, 31 The Hamlet, East Amherst, NY (US) 14051; Zach Liang, 7185 Pendale Cir., North Tonawanda, NY (US) 14120

( * ) Notice: Subject to any disclaimer, the term of this patent is extended or adjusted under 35 U.S.C. 154(b) by 866 days.

(21) Appl. No.: 10/455,857

(22) Filed: Jun. 6, 2003

(65) Prior Publication Data

US 2003/0223659 A1 Dec. 4, 2003

Related U.S. Application Data

(63) Continuation-in-part of application No. 09/994,148, filed on Nov. 26, 2001, now abandoned.

(51) Int. Cl.
*F16F 11/00* (2006.01)
(52) U.S. Cl. .................. 267/205; 267/141; 213/32 R
(58) Field of Classification Search ............ 267/205, 267/209–212, 140, 152, 153, 141; 188/129; 248/633; 52/167.1–167.9; 213/32 R
See application file for complete search history.

(56) References Cited

U.S. PATENT DOCUMENTS

| | | | |
|---|---|---|---|
| 1,169,862 A * | 2/1916 | Peycke ............... 267/211 |
| 1,503,192 A * | 7/1924 | Langton .............. 213/22 |
| 1,637,150 A * | 7/1927 | Haseltine ............. 213/32 R |
| 1,884,594 A * | 10/1932 | Davis ................ 213/30 |
| 2,534,137 A * | 12/1950 | Lewis ............... 428/169 |
| 3,796,288 A | 3/1974 | Hollnagel |
| 3,984,125 A | 10/1976 | Paton et al. |
| 4,002,315 A * | 1/1977 | Van Goubergen ...... 248/633 |
| 4,025,063 A * | 5/1977 | Willison .............. 267/153 |
| 4,093,042 A | 6/1978 | Pradon |
| 4,177,884 A | 12/1979 | Vinten |
| 4,262,887 A | 4/1981 | Jansen |
| 4,358,096 A | 11/1982 | Paton et al. |
| 4,644,714 A | 2/1987 | Zayas |
| 4,674,725 A * | 6/1987 | Popper ............... 248/562 |
| 4,674,729 A | 6/1987 | Wallace |
| 4,766,706 A | 8/1988 | Caspe |
| 4,934,493 A | 6/1990 | Bauer et al. |
| 5,205,384 A | 4/1993 | Heshmat |

(Continued)

FOREIGN PATENT DOCUMENTS

WO    WO 02/090681 A1    11/2002

*Primary Examiner*—Christopher P Schwartz
(74) *Attorney, Agent, or Firm*—Hodgson Russ LLP

(57) ABSTRACT

A friction damper comprises a channel member including at least one friction channel and a wedge member including at least one friction wedge received by a corresponding friction channel for sliding motion along the channel relative to the channel member. Each friction channel has a pair of internal sidewalls connected by an internal transverse wall, wherein at least one of the pair of sidewalls forms an obtuse angle with the transverse wall. In a preferred construction, the sidewalls are symmetrically convergent as they approach the connecting transverse wall. Each friction wedge includes a pair of external sidewalls parallel to the internal sidewalls of the channel, wherein the external sidewalls of the friction wedge are movable into surface-to-surface engagement with the internal sidewalls of the friction channel by adjusting the depth of receipt of the friction wedge in the friction channel. The friction damper of the present invention makes it possible to increase the equivalent friction coefficient by a factor of up to ten to twenty times.

10 Claims, 11 Drawing Sheets

U.S. PATENT DOCUMENTS

| | | | |
|---|---|---|---|
| 5,330,165 A * | 7/1994 | van Goubergen | 267/141 |
| 5,357,723 A | 10/1994 | Sasaki et al. | |
| 5,456,047 A | 10/1995 | Dorka | |
| 5,655,632 A | 8/1997 | Valembois | |
| 5,765,322 A | 6/1998 | Kubo et al. | |
| 5,819,484 A | 10/1998 | Kar | |
| 5,884,440 A | 3/1999 | Kubo et al. | |
| 6,269,752 B1 | 8/2001 | Taillon | |

* cited by examiner

FRICTION DAMPER

CROSS-REFERENCE TO RELATED APPLICATION

This application is a continuation-in-part of U.S. application Ser. No. 09/994,148, filed Nov. 26, 2001, now abandoned, which is incorporated herein by reference.

FIELD OF THE INVENTION

The present invention relates generally to the field of energy dissipation devices for a variety of applications including dissipation of seismic energy.

DESCRIPTION OF RELATED ART

Friction dampers for use in earthquake vibration reduction are known. Friction dampers operate by converting kinetic energy, such as seismic vibration kinetic energy, into heat. In a friction damper, relative motion is created between contacting surfaces. Since friction dampers are mostly used in situations where the effects of relatively large forces are to be mitigated or constrained, there is a need for new friction dampers that are economical, compact and efficient in operation.

One prior friction damper device is disclosed in International Publication No. WO 02/090681 A1. The device generally comprises a central plate rotatably mounted between a pair of side plates. Friction shims are provided between the central plate and the side plates, and a clamping force is exerted along the axis of rotation by a nut and bolt pair and disc springs mounted thereon. The central member is rigidly attached to one structural member, while the side plates are rigidly attached to another structural member. The device thereby provides a frictionally dampened rotational joint. It is clear that such a device, of any reasonable size, would be insufficient in controlling or ameliorating seismic forces.

Another prior friction damper is a so-called "friction pendulum" bearing described in U.S. Pat. No. 4,644,714. This device includes an articulated slider that may slide translationally on an underlying concave spherical surface. The pivot point of the articulated slider is substantially near to the interface of the slider and concave surface. This device must be made quite large to achieve a desirably long oscillation period.

U.S. Pat. No. 4,358,096 describes a vehicle suspension system comprising a tubular housing enclosing friction wedge members 39 and 41 having friction pads 42 and 43 spring loaded for contact with converging internal friction ramps 8, such that the variable rate friction damping is achieved as the friction pads 42 and 43 move axially with respect to inclined friction ramps 8. The described system does not provide enough frictional force to effectively dampen seismically induced vibrations in structures, or to mitigate other very large forces.

Other prior friction dampers generally comprise coaxial inner and outer cylindrical members having contacting cylindrical surfaces, wherein the contacting cylindrical surfaces slide relative to one another during axially directed relative displacement between the members. Here, the fit tolerance between the members influences frictional force and energy dissipation. An example of this type of prior art frictional damping device is described in U.S. Pat. No. 4,934,493.

U.S. Pat. No. 5,655,632 teaches a frictional damper device that includes first and second cylindrical assemblies 100 and 300 movable with respect to one another in axially guided fashion, a plurality of friction shoes 400 in contact with the first assembly, and resilient beams 510 extending generally radially between the second assembly and the shoes, whereby the shoes are forced against the first assembly when relative axial motion occurs between the first and second assemblies in a predetermined axial direction due to buckling of the beams. A drawback of this device, from the standpoint of seismic energy dissipation, is that it is designed to operate in one axial direction only.

U.S. Pat. No. 5,819,484 discloses a supplemental damper unit for a structural bracing system wherein the damper unit includes a friction spring stack that is loaded in compression regardless of whether the housing of the damper unit is loaded in tension or compression. The friction spring stack includes inner rings 84 and outer rings 88 arranged in alternating fashion along an axis of the damper unit. Each inner ring 84 has two radially outward facing conical surfaces 85 in frictional contact with a corresponding radially inward facing conical surface 89 of an outer ring 88.

It is also known in the prior art to provide an isolation and damping device having multiple stacked layers or plates sandwiched between top and bottom end plates. See, for example, U.S. Pat. Nos. 5,765,322 and 5,884,440, both to Kubo et al., which show alternating hard plate and soft plate layers. For another example of this type of device, please see U.S. Pat. No. 5,456,047. Further in this regard, U.S. Pat. No. 4,766,706 discloses a sandwiched system of three levels of low friction plates beneath a structural column, interconnected by three levels of diaphragm linkages, for restricting the movement of the column and walls solely to a combination of frictionally damped orthogonal, rectilinear motion.

U.S. Pat. No. 5,357,723 discloses an isolation bearing with damping capability characterized plates having rollers therebetween, wherein the plate surfaces in contact with the rollers are provided with an elastomeric damping surface portion or portions 5, and a rigid surface portion or portions 6.

In view of the foregoing, it is apparent that there is a need for new friction dampers that are compact, economical, and yet capable of efficiently dissipating large forces. Friction dampers to be used in structures such as bridges or buildings for seismic energy dissipation must provide large and substantially constant frictional damping force, on the order of 20,000 kN, without making the friction damper unsuitably large or bulky. There is a need for a friction damper configuration that is efficient in the sense that it compactly incorporates significant frictional surface area and requires relatively little normal force to provide a large frictional damping force.

SUMMARY OF THE INVENTION

To meet the mentioned need, a friction damper of the present invention generally comprises a channel member including at least one friction channel extending along a friction axis, and a wedge member including at least one corresponding friction wedge received by an associated friction channel for sliding motion along the friction axis relative to the channel member. Each friction channel has a pair of internal sidewalls connected by an internal transverse wall, wherein at least one of the pair of sidewalls forms an obtuse angle with the transverse wall. In a preferred construction, the sidewalls converge toward one another as they approach the connecting transverse wall in symmetric fashion about a centerline of the friction channel. The corresponding friction wedge includes a pair of external sidewalls parallel to the internal sidewalls of the channel, wherein the external sidewalls of the wedge are movable into respective surface-to-surface engagement with the internal sidewalls of the friction channel by adjusting the depth of receipt of the wedge in the friction channel. Preferably, each of the internal sidewalls of the friction channel forms an angle in the range from 93° through 102° with the transverse internal wall of the channel. The configuration of the present invention enables a large friction force to be generated using a modest normal force pushing the wedge deeper into the channel such that the sidewalls of the wedge engage the sidewalls of the channel. Frictional force can be increased by adding more contact surface area, for example by adding or enlarging plates. Frictional force can also be increased by increasing normal force through the addition of springs and the like, such as compression springs or other types of spring elements.

In one embodiment of the present invention, the channel member is formed as a cut length of a steel I-beam which provides two friction channels in mirror image, and two friction members are provided, one for each of the friction channels.

In a further embodiment, multiple channel/wedge members are provided in stacked relation. Each channel/wedge member includes a plurality of parallel friction channels separated by a plurality of parallel friction wedges, and orthogonal friction directions are provided among the stacked members. In this manner, a large friction force is generated in a very compact mechanism under moderate normal force.

As a further feature of the present invention, the external sidewalls of the friction wedges can be maintained just out of engagement with the internal sidewalls of the friction channels by a plurality of shear keys designed to fail under predetermined loading conditions. Upon failure of the shear keys, such as may occur during an earthquake event, the wedges are forced deeper into the channels to bring about surface-to-surface engagement of the external sidewalls of a wedge with the internal sidewalls of a corresponding friction channel. Additionally, the friction damper of the present invention can be installed in series with a clutch mechanism designed to allow limited thermal expansion and contraction displacements between the isolated structural members without engagement of the friction damper.

The present invention also encompasses a novel isolation bearing that can incorporate the inventive friction damper. The isolation bearing generally comprises a lower plate adapted for attachment to a base structural member and an upper plate adapted for attachment to a superstructure supported on the base. The lower plate has an upwardly facing bearing surface and the upper plate has a downwardly facing bearing surface, and a roller is situated between and in rolling contact with the bearing surfaces. At least one of the bearing surfaces has a generally V-shaped profile characterized by a smoothly curved transition zone across an imaginary vertex of the V-shaped profile. Preferably, the transition zone is defined by a damping insert formed of rubber or synthetic viscoelastic material fixed in the crotch of the V-shaped profile. This configuration introduces nonlinear lateral stiffness to the bearing without the use of added nonlinear spring elements. The other bearing surface may be flat, cylindrical, or have its own generally V-shaped profile. Use of a cylindrical surface introduces linear lateral stiffness to the isolation bearing without the use of added linear spring elements. Such an isolation bearing is disclosed and claimed in U.S. patent application Ser. No. 09/994,148, now abandoned, from which the present application claims benefit as a continuation-in-part.

The friction damper embodiments of the present invention are useful in bridges and buildings to control or ameliorate the effects of seismic energy, in providing a stable platform on which large and valuable objects such as large computers and power substations may be placed to protect them from the effects of seismic energy, and in such other situations as a backstop for stopping trains in a station or docking large ships in a shipyard.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
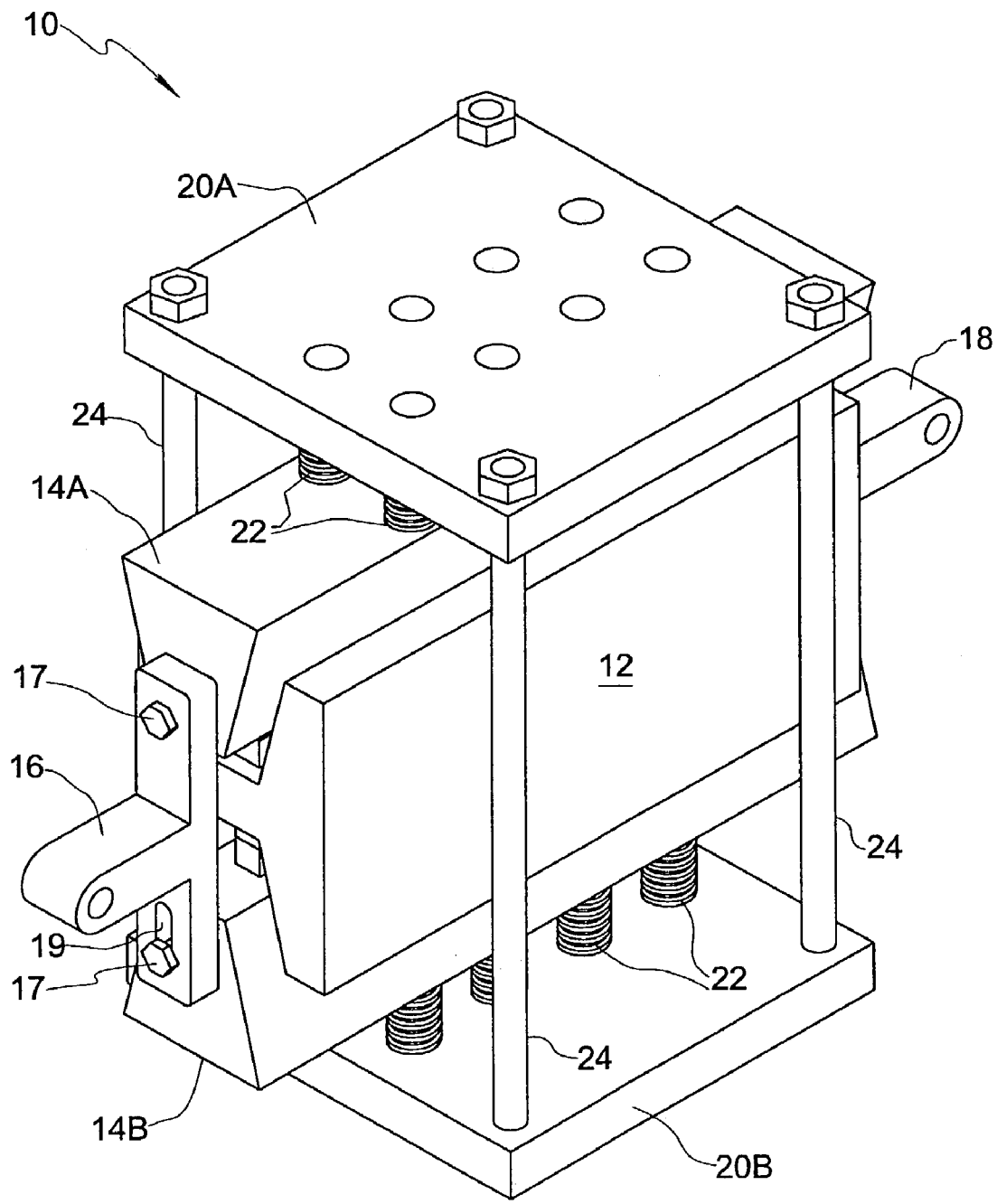
FIG. 1 is a perspective view of a friction damper formed in accordance with a basic embodiment of the present invention, wherein the friction damper is in a pre-engaged condition.

Referring initially to FIGS. 1 through 6 of the drawings, a friction damper 10 embodying the present invention in a basic form generally comprises a channel member 12 including a pair of friction channels 13A, 13B, and a pair of wedge members 14A, 14B themselves defining friction wedges respectively received by channels 13A, 13B. Channels 13A, 13B each include a pair of internal sidewalls 26 connected by an internal transverse wall 27. In the embodiment shown, both of the internal sidewalls 26 form an obtuse angle with transverse wall 27. Wedge members 14A, 14B each include a pair of external sidewalls 28 movable into respective surface-to-surface engagement with internal sidewalls 26 of the corresponding channel by adjusting depth of receipt of the wedge member in the friction channel. Channel member 12 and wedge members 14A, 14B are preferably formed of steel. The surfaces of internal sidewalls 26 and external sidewalls 28 act as the friction surfaces of friction bearing 10, and may be appropriately treated or textured by machining or application of a friction material to provide suitable friction characteristics. For sake of economy, channel member 12 is preferably formed from a cut segment of a standard sized steel I-beam.

Wedge members 14A and 14B are linked together by a coupling member 16 fastened to each wedge member by a bolt 17 mating with a threaded hole 21 in an end face of the corresponding wedge member. Coupling member 16 includes a connection portion having a transverse through-hole 32 for enabling the coupling member to be pivotally attached to a structural member or to an intermediate link connecting the coupling member to a structural member. As will be understood, coupling member 16 causes wedge members 14A and 14B to travel back and forth together relative to friction channels 13A and 13B. Coupling member 16 includes a slot 19 through which one of the bolts 17 passes, whereby the wedge members are free to move in a depth direction of friction channels 13A, 13B.

Channel member 12 includes a connection portion 18 having a transverse through-hole 36 for enabling the channel member to be pivotally attached to another structural member isolated from the first structural member to which coupling member 16 is connected, or to an intermediate link connecting the channel member to the other structural member. In the figures, the connection portion of channel member 12 is shown as being integrally formed with the channel member itself, however a separate part could be machined and fixed to an end of channel member 12. Through-holes 32 and 36 are preferably arranged at opposite ends of friction damper 10 to allow space for pivotal attachment. While through-holes are shown, other configurations can be provided, such as ball-and-socket connection means, depending on the application and installation parameters.

Figure 2:
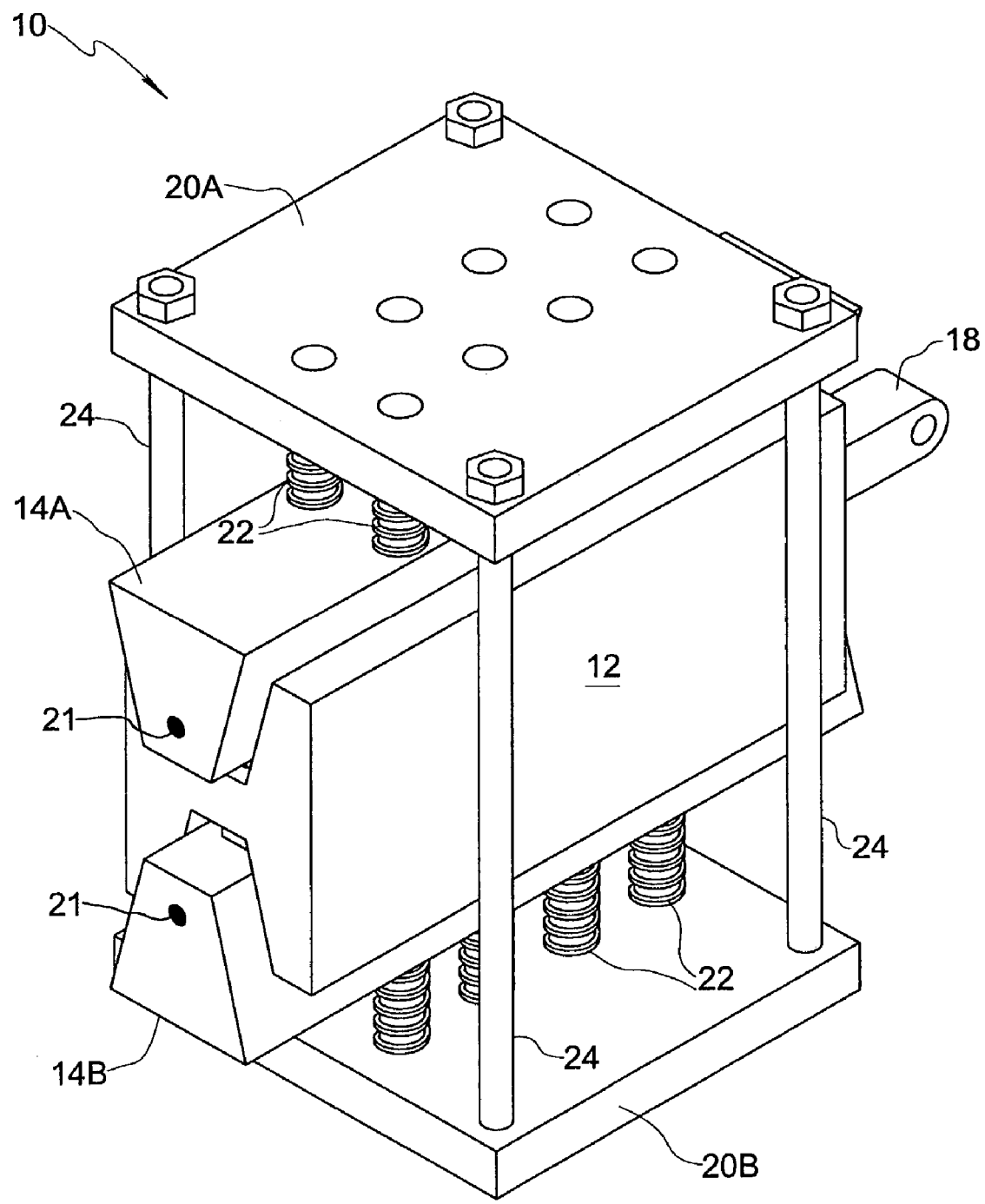
FIG. 2 is a perspective view similar to that of FIG. 1, but with a wedge member coupling of the friction damper removed for sake of clarity, wherein the friction damper is in an engaged condition.
Figure 3:
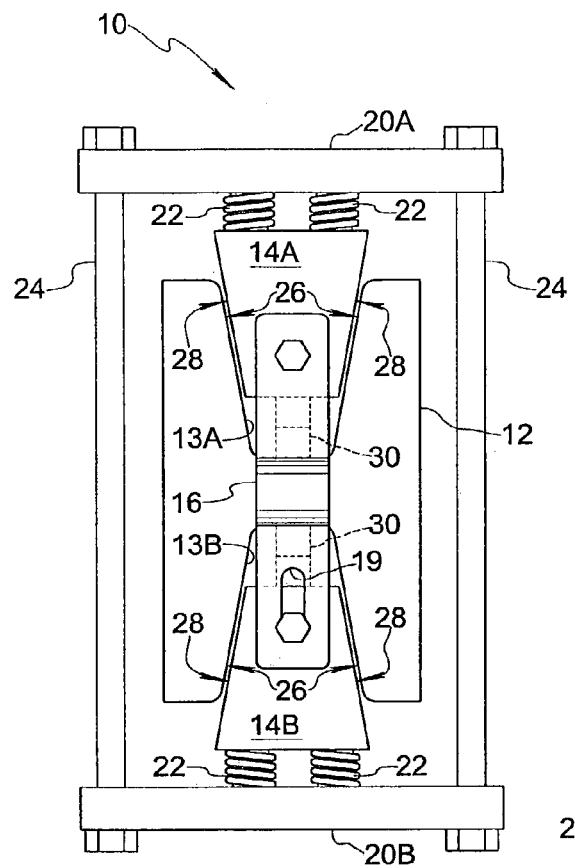
FIG. 3 is a front end view of the friction damper shown in FIG. 1, wherein the friction damper is in a pre-engaged condition.
Figure 4:
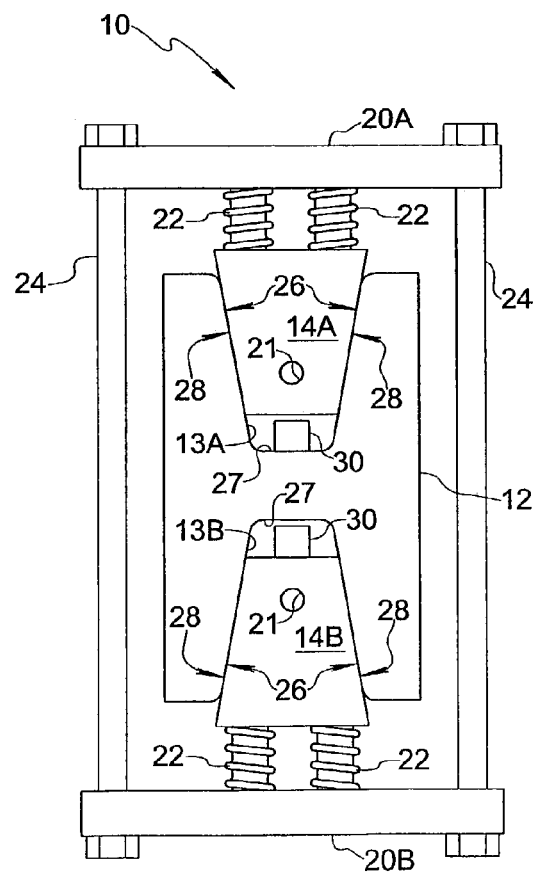
FIG. 4 is a front end view similar to that of FIG. 3, but with the wedge member coupling of the friction damper removed for sake of clarity, wherein the friction damper is in an engaged condition.
Figure 5:
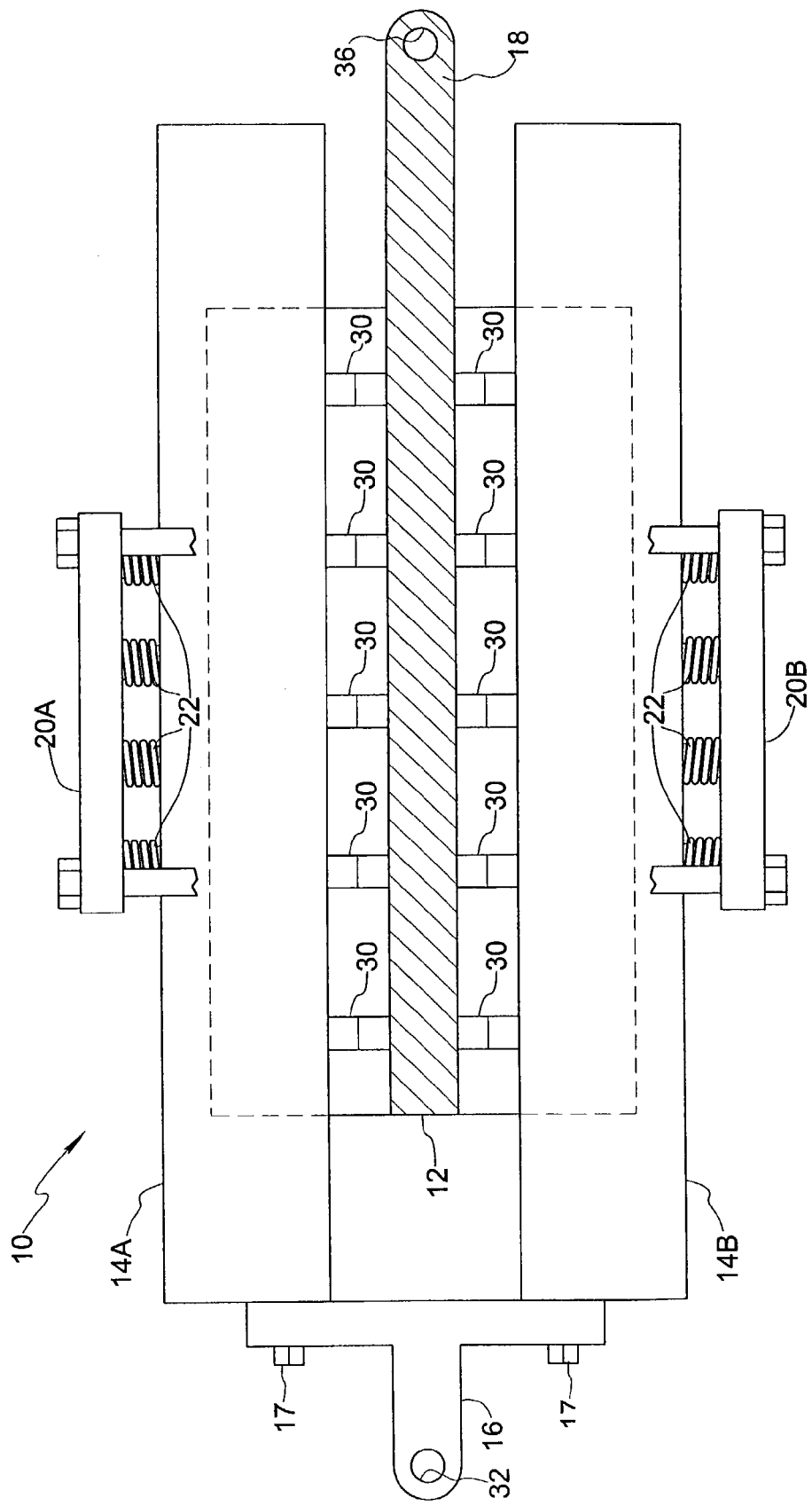
FIG. 5 is a side view of the friction damper shown in the previous figures, partially sectioned to show a plurality of shear keys for maintaining the friction damper in a pre-engaged condition.
Figure 6:
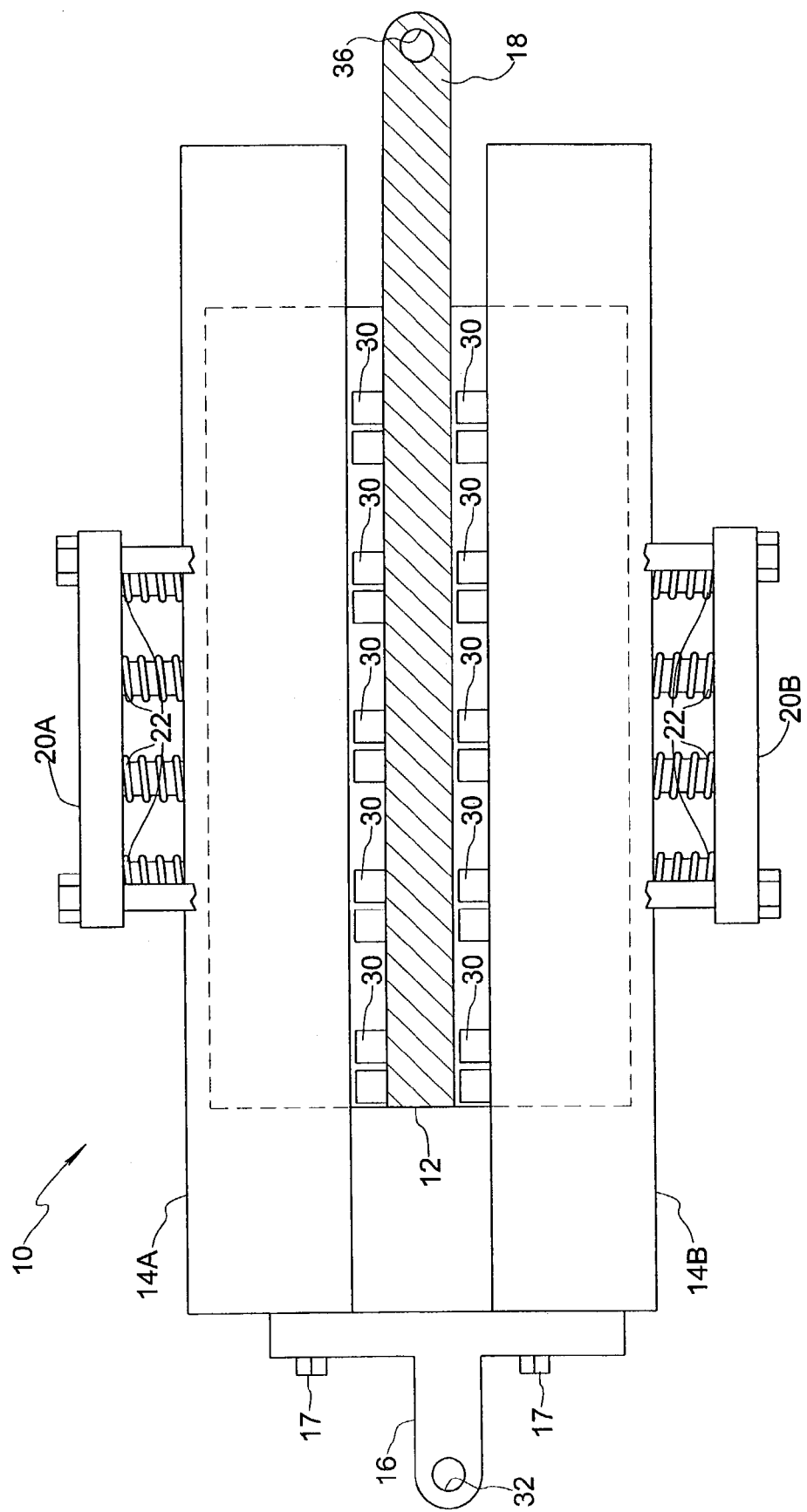
FIG. 6 is a partially sectioned side view similar to that of FIG. 5, wherein the friction damper is in an engaged condition.

Friction damper 10 further comprises a containment frame including a pair of rectangular plates 20A, 20B fixed in relation to each other by a plurality of connecting legs 24. Plates 20A, 20B are arranged to face in the direction of transverse channel wall 27 of a corresponding channel 13A, 13B. A plurality of springs 22 are arranged on guide posts to act between plate 20A and wedge member 14A to urge wedge member 14A deeper into channel 13A. Likewise, further springs 22 are provided to act between plate 20B and wedge member 14B to urge wedge member 14B deeper into channel 13B. When friction damper 10 is in a pre-engaged condition as depicted in FIGS. 1, 3, and 5, a plurality of shear keys 30 reside between transverse channel wall 27 and a facing surface of an associated wedge member 14A, 14B to limit the insertion depth of the wedge member in the channel, thus preventing surface-to-surface engagement between external sidewalls 28 and internal sidewalls 26. Shear keys 30 are designed to fail under predetermined shear loading conditions as might be encountered at the outset of earthquake-induced seismic excitation. When shear keys 30 fail as shown in FIGS. 2, 4, and 6, wedge members 14A, 14B are free to move deeper into channels 13A, 13B under the normal biasing force from springs 22 such that external sidewalls 28 move into respective surface-to-surface engagement with internal sidewalls 26 of the corresponding channel. As will be appreciated, shear keys 30 keep the friction surfaces of the wedge members 14A, 14B and channels 13A, 13B from rusting together after the friction damper 10 has been installed in a structure so that the friction damper is ready to function when an earthquake strikes. Failure of shear keys 30 can be by breaking, sliding, any other suitable action, or a combination of these.

Figure 7:
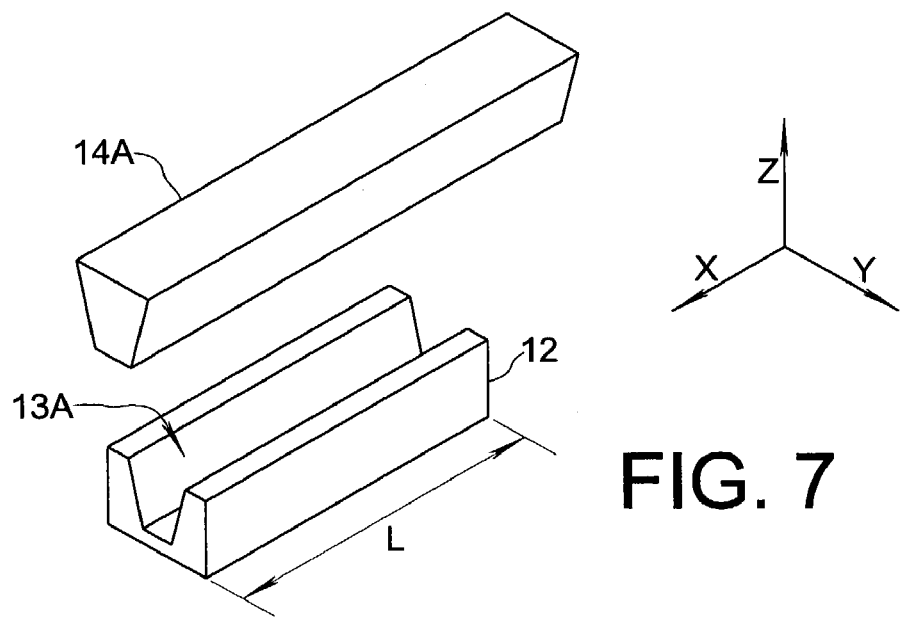
FIG. 7 is a perspective schematic representation showing mathematical nomenclature associated with a friction damper of the present invention.
Figure 8:
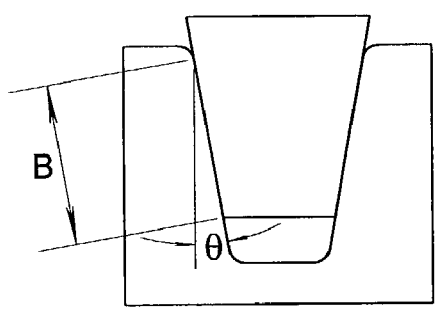
FIG. 8 is an end view schematic representation showing additional mathematical nomenclature associated with a friction damper of the present invention.
Figure 9:
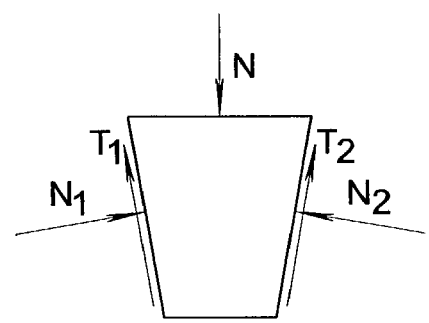
FIG. 9 is a schematic diagram illustrating forces on a friction wedge of a friction damper of the present invention.

Attention is now directed to FIGS. 7-9, which help illustrate mathematical nomenclature for describing the invention. In FIG. 7, the length of channel 13A is designated as L, the friction axis along which relative displacement occurs between channel member 12 and wedge member 14A is chosen as the X-axis, and the channel depth direction corresponds to the Z-axis. In FIG. 8, the working height of the common contact area between engaged surfaces of the wedge member and channel is designated as B, and the angle of internal sidewall of the channel relative to the Z-axis is designated as $\theta$. FIG. 9 is a force diagram showing forces acting on the wedge member when at rest in an engaged condition, including a normal force N applied on a topside of wedge member (for example by springs 22 shown in FIGS. 1-6), a pair of normal forces $N_1$ and $N_2$ acting normal to respective external sidewalls of the wedge member, and tangential friction forces $T_1$ and $T_2$ acting along respective external sidewalls of the wedge member as shown.

Assuming the stated geometry and the occurrence of relative motion between the wedge member and the channel member along the X-axis, an equivalent friction coefficient $\mu_{EQ}$ can be defined as follows:

$$\mu_{EQ} = \mu_D / \sin(\theta)$$

where $\mu_D$ is the dynamic friction coefficient. Thus, the equivalent friction coefficient $\mu_{EQ}$ is greater than the dynamic friction coefficient $\mu_D$. The following table illustrates the relationship between angle θ and the multiplier factor 1/sin(θ) that determines the resulting equivalent friction coefficient $\mu_{EQ}$.

| Angle θ (degrees) | 12 | 11 | 10 | 9 | 8 | 7 | 6 | 5 | 4 | 3 |
|---|---|---|---|---|---|---|---|---|---|---|
| 1/sin(θ) | | 4.81 | 5.24 | 5.76 | 6.39 | 7.16 | 8.20 | 9.57 | 11.47 | 14.33 | 19.11 |

The following examples demonstrate applicability of the present invention in two cases having different engineering parameters.

| Example 1: Friction material: | |
|---|---|
| Required friction force | F = 50,000 lb. |
| Allowed pressure: | P = 870 psi |
| Dynamic friction coefficient | $\mu_D$ = 0.5 |
| Working angle | θ = 4° |
| Equivalent friction coefficient | $\mu_{EQ}$ = 7.1 |
| Required normal force | N = 7,000 lb |
| Required side force | $N_i$ = 100,000 lb |
| Working area | A = 115 in² |
| Working height | B = 5 in |
| Working length | L = 23 in |
| Example 2: Steel-cast iron | |
| Required friction force | F = 100,000 lb. |
| Allowed pressure: | P = 20 ksi |
| Dynamic friction coefficient | $\mu_D$ = 0.18 |
| Working angle | θ = 5° |
| Equivalent friction coefficient | $\mu_{EQ}$ = 2.0 |
| Require normal force | N = 50,000 lb |
| Require side force | $N_i$ = 550,000 lb |
| Working area | A = 27.6 in² |
| Working height | B = 3.5 in |
| Working length | L = 8.0 in |

An important feature of the present invention is the use of sloped surfaces to achieve a large frictional damping force with very limited normal force. It is seen that, with the V-shaped friction surfaces, the equivalent friction coefficient can be several times larger then original dynamic friction coefficient values. Upon choosing the right paired friction surfaces, the friction force can be ten times larger than the normal force. The constant normal force can be generated by springs 22. For example, if a normal force of 50 kps is required and a compression distance of 2 inches is allowed, the spring constant is 25 kps/in, which is achieved using common materials. It will also be appreciated that the present invention provides high frictional damping force using commonplace and economical materials, for example rectangular steel bar stock and a steel I-beam section. In addition, the present invention achieves these results in a compact design.

Figure 10:
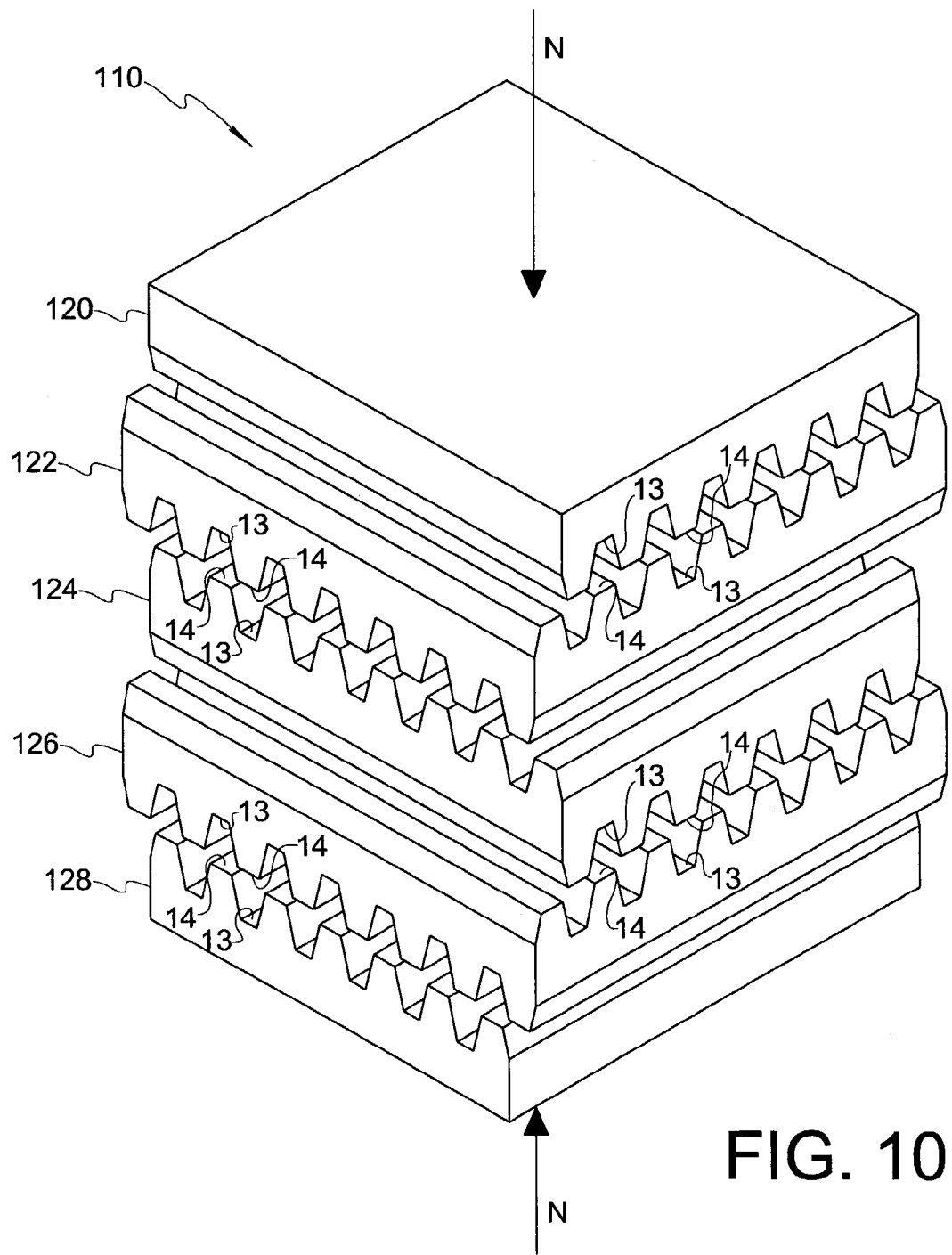
FIG. 10 is a perspective schematic diagram showing a friction damper formed in accordance with a further embodiment of the present invention.

FIG. 10 shows a friction damper 110 formed in accordance with a further embodiment of the present invention. Friction damper 110 illustrates the use of parallel friction channels and wedges in a single member, and stacking of members, to generate large friction damping force. As can be seen, a plurality of members 120, 122, 124, 126, and 128 are provided in stacked relation. All of the members include a plurality of parallel friction channels 13 separated by a plurality of parallel friction wedges 14. In top member 120, the channels 13 and wedges 14 are formed only in a downwardly facing surface of the member, while in bottom member 128, the channels 13 and wedges 14 are formed only in an upwardly facing surface of the member. Intermediate wedge members 122, 124, and 126 include channels 13 and wedges 14 on both an upwardly facing surface and a downwardly facing surface thereof, wherein the channels and wedges on the upwardly facing surface extend in an orthogonal direction relative to the channels and wedges on the downwardly facing surface. A normal force N is shown only schematically, and may be introduced by springs or other suitable biasing means. As will be appreciated, the stacked configuration of friction damper 110 provides multiple friction surfaces to increase frictional force, and also provides frictional force components in orthogonal directions. Moreover, it does so in a geometrically compact manner. Members 120, 122, 124, 126, and 128 can be inexpensively machined from steel plate, and members 120 and 128 may be provided with holes to adapt such members for attachment to a base or superstructure (not shown). Further member layers can be introduced depending on design considerations.

FIGS. 11-17 illustrate the use of a clutch mechanism 40 installed in series with basic friction damper 10 between a base structural member 6 and a superstructure 8 supported by the base structural member 6 (the support is not shown in these Figures). By way of example, base structural member could be a bridge pier and superstructure 8 could be the bridge roadway. The purpose of clutch mechanism 40 is to accommodate limited relative motion between base 6 and superstructure 8, such as that which might accompany thermal expansion and contraction of the structural elements, without an accompanying engagement of friction damper 10.

Figure 11:
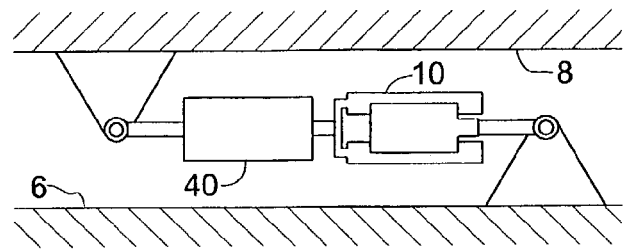
FIG. 11 is a schematic view showing a friction damper of the present invention installed between a bridge pier and a superstructure, wherein a clutch mechanism is installed in series with the friction damper for accommodating thermal expansion and contraction without engagement of the friction damper.
Figure 16:
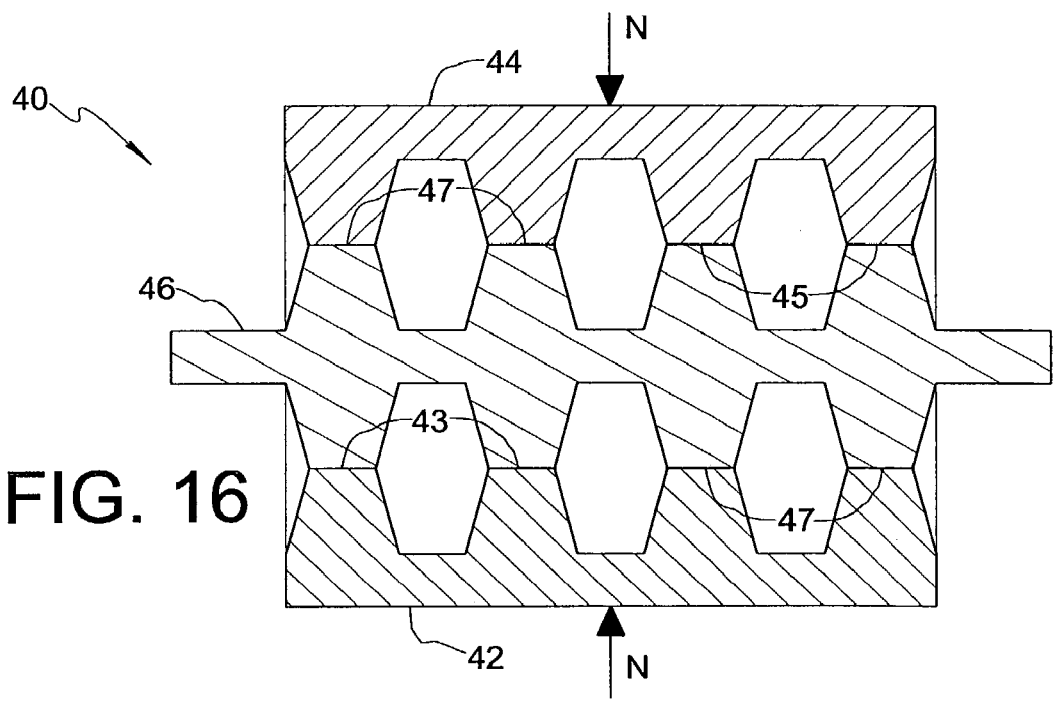
FIG. 16 is a detailed cross-sectional view showing the clutch mechanism represented in FIGS. 11-15 in a pre-engaged position.

FIG. 16 shows one embodiment of the clutch mechanism 40 schematically in a pre-engaged state. Clutch mechanism 40 includes outer clutch members 42 and 44 having inwardly projecting teeth 43 and 45, respectively, and a central clutch member 46 having outwardly projecting teeth 47. A normal force N is applied as shown to the outer clutch members 42 and 44; the force could be applied by springs in a manner similar to the arrangement of springs 22 providing normal force for friction damper 10. When clutch mechanism 40 is in its pre-engaged state, the flat crests of inwardly projecting teeth 43 and 45 are in abutment against the flat crests of outwardly facing teeth 47 as shown in FIG. 16. To install clutch mechanism 40 in series with friction damper 10 as shown in FIG. 11, either the central clutch member 46 or the pair of outer clutch members 42, 44 is positively connected to an end of the friction damper (either to coupling member 16, as depicted in FIG. 11, or to connecting portion 18 if the friction damper has an opposite orientation). The remaining clutch member or clutch member pair is then positively connected to superstructure 8 as shown.

Figure 17:
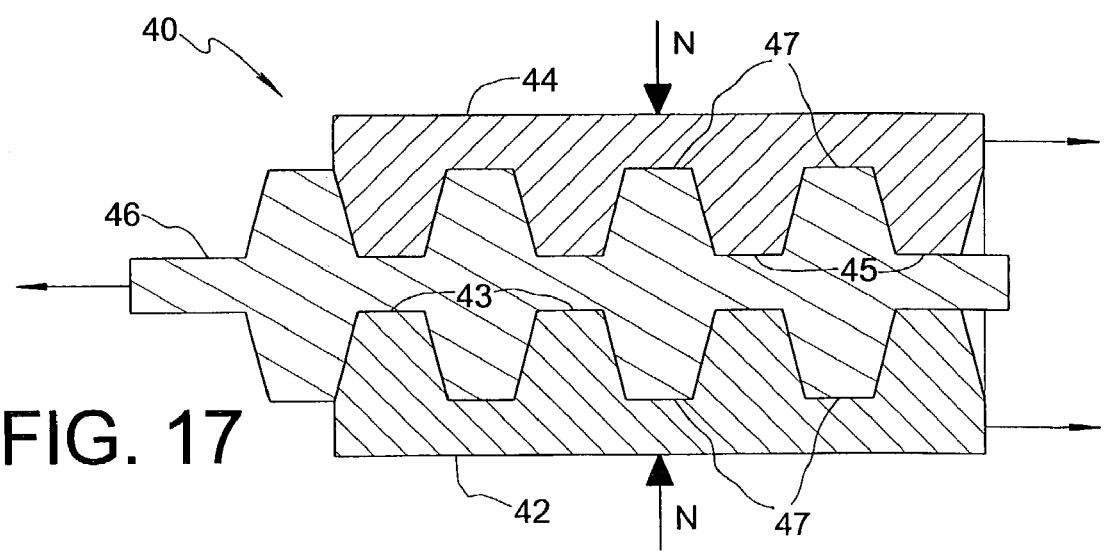
FIG. 17 is a view similar to that of FIG. 16, however showing the clutch mechanism in an engaged position.

FIG. 17 shows clutch mechanism 40 in an engaged state. As will be understood, outer clutch members 42, 44 can slide a limited distance (the width of a flat tooth crest) in either X-axis direction, beyond which point teeth 43, 45 interlock with teeth 47 under the normal force N as shown. The crest width is chosen to allow the necessary thermal contraction and expansion to take place with engagement of the clutch mechanism. However, greater relative displacements, as would be encountered during an earthquake, will cause clutch mechanism 40 to engage. Teeth 43, 45, and 47, and normal force N, are chosen such that clutch mechanism 40 will not disengage so that force is transmitted between the clutch mechanism and the friction damper.

Figure 12:
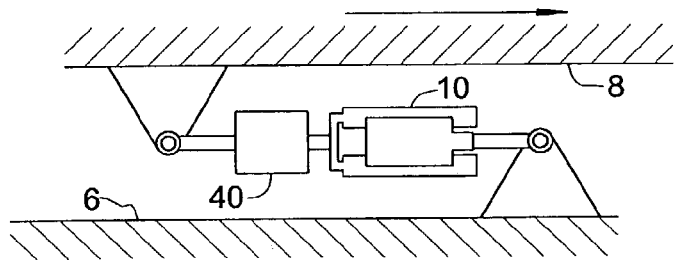
FIG. 12 is a schematic view similar to that of FIG. 11, however the clutch mechanism is shown just after it has become engaged under seismic excitation.
Figure 13:
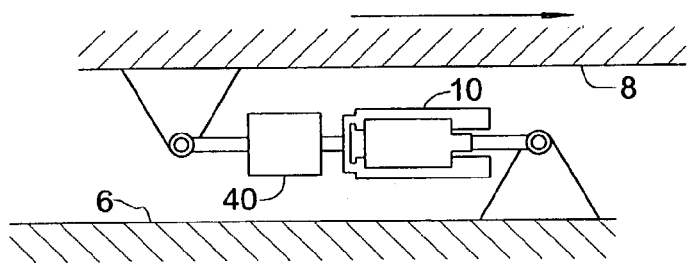
FIG. 13 is a schematic view similar and subsequent in time to that of FIG. 12, wherein action of the friction damper in a first direction can be seen.
Figure 14:
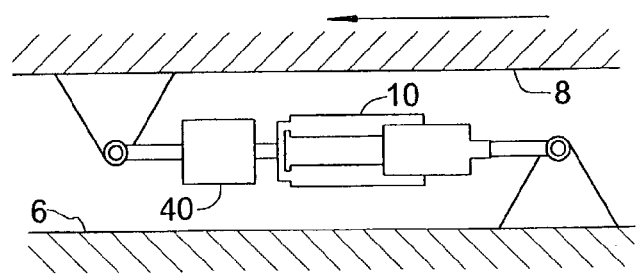
FIG. 14 is a schematic view similar and subsequent in time to that of FIG. 13, wherein action of the friction damper in an opposite direction can be seen.
Figure 15:
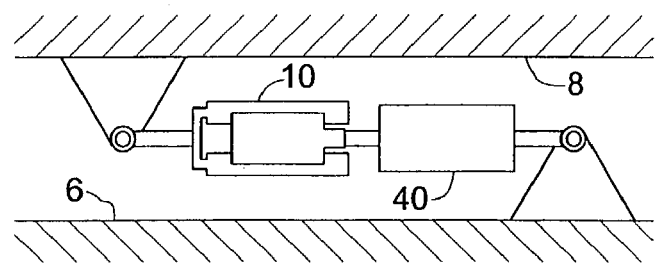
FIG. 15 is a schematic view similar to that of FIG. 11, however showing an alternative arrangement of the clutch mechanism.

Returning to FIG. 11, the system is shown at rest, wherein one end of friction damper 10 is connected to base 6, the other end of friction damper 10 is connected to an end of clutch mechanism 40, and the other end of clutch mechanism 40 is connected to superstructure 8. Upon relative displacement between base 6 and superstructure 8 beyond the limit designed into clutch mechanism 40, the clutch mechanism 40 will engage. FIG. 12 shows the system just after the clutch mechanism has engaged. At this point, one end of the friction damper 10 that is coupled to clutch mechanism 40 is now positively connected to superstructure 8 due to the engagement of the clutch mechanism. FIG. 13 shows subsequent displacement in the same direction, wherein friction damper 10 is activated. As shown in FIG. 14, friction damper 10 remains activated during seismic oscillations. It will be realized that clutch mechanism 40 can also be installed between base 6 and friction damper 10 as shown in FIG. 15.

Figure 18:
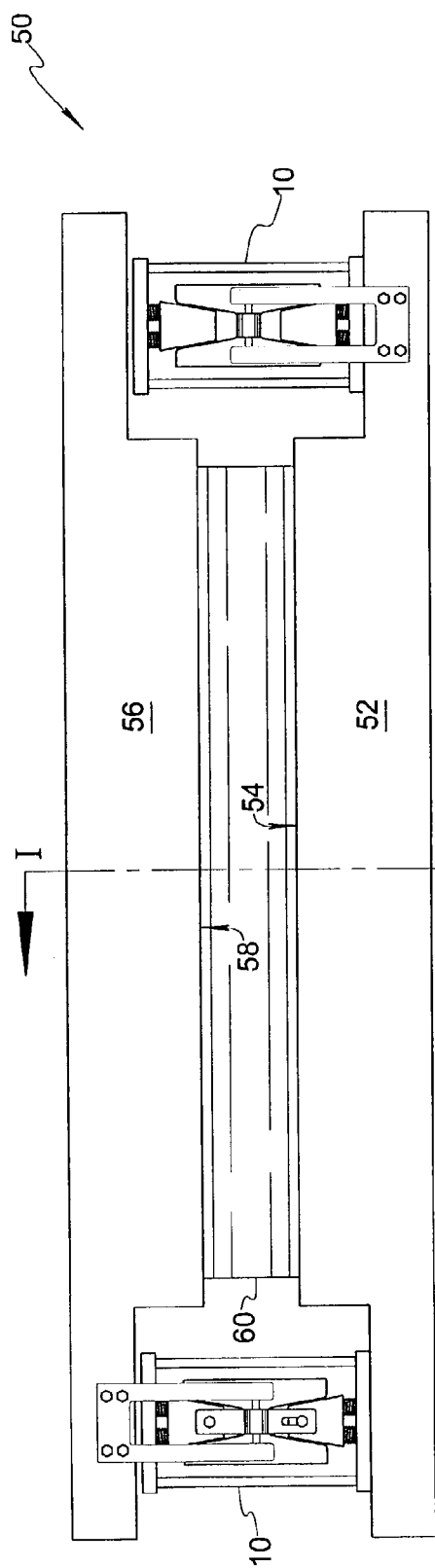
FIG. 18 is a simplified elevational view of an isolation bearing formed in accordance with a further aspect of the present invention.
Figure 19:
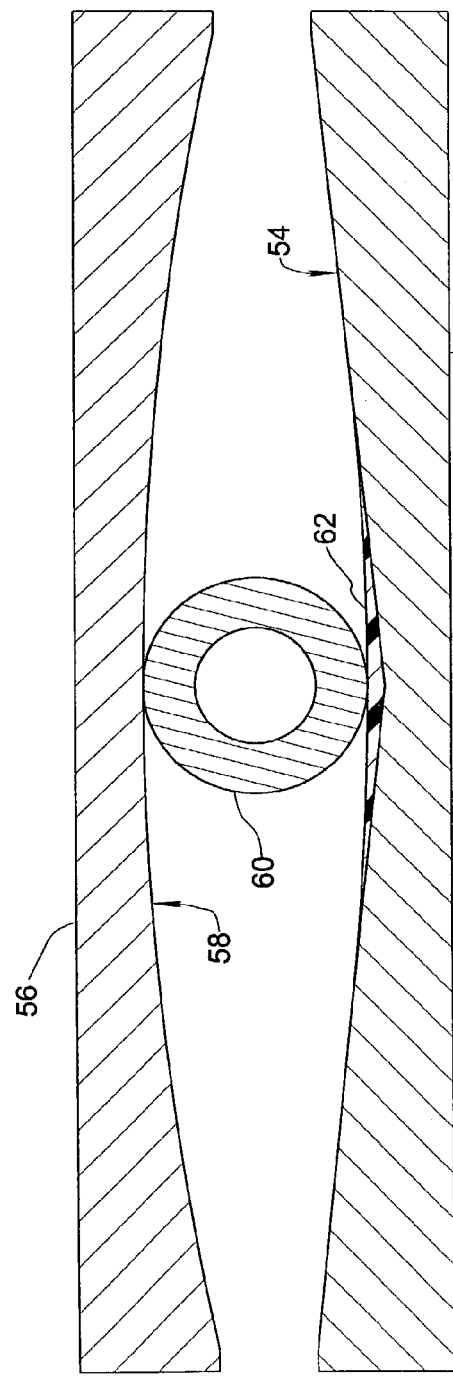
FIG. 19 is a simplified cross-sectional view of taken generally along the line I-I in FIG. 18.

Attention is now directed to FIGS. 18 and 19, which show an isolation bearing 50 incorporating friction dampers 10 (FIG. 18 only) and being formed in accordance with a further aspect of the present invention. Isolation bearing 50 comprises a lower plate 52 adapted for attachment to a base, an upper plate 56 adapted for attachment to a superstructure, and a roller 60 between plates 52 and 56. As best seen in FIG. 19, lower plate 52 includes an upwardly facing bearing surface 54 having a gradually sloped V-shaped profile, while upper plate 56 includes a downwardly facing bearing surface 58 in the form of a cylindrical surface. Bearing surfaces 54 and 58 are in rolling contact with roller 60, which in the present embodiment is configured as a cylindrical roller. It is noted that the bearing surfaces could be switched one for the other, namely upwardly facing bearing surface 54 could be a cylindrical surface and downwardly facing bearing surface 58 could have a V-shaped profile. The V-shaped profile causes isolation bearing 50 to be self-centering in a manner described in aforesaid U.S. patent application Ser. No. 09/994,148, now abandoned. Use of a cylindrical bearing surface provides an effect equivalent to that of a linear spring by introducing linear lateral stiffness. It is preferred that the cylindrical surface have a gradual curvature that is "flattened" with respect to the vertical direction, however a circular arc profile will typically be less expensive to manufacture. For example, the cylindrical surface preferably has a profile described by the equation $(x-h)^2+(y-k)^\beta=r^2$, where $\beta<=2$, and h and k are respectively the x and y coordinates of the center of curvature. For performance reasons, it may be preferable that the profile be confined to a condition where exponent $\beta$ is less than 2, whereas for manufacturing economy, it may be preferable that the profile be confined to a condition where exponent $\beta$ is equal to 2.

In accordance with the present invention, generally V-shaped bearing surface 54 is characterized by a smoothly curved transition zone across an imaginary vertex thereof. The curved transition zone is preferably provided by a damping insert 62 formed of a suitable damping material, such as rubber or synthetic viscoelastic material, and fixed at a crotch of the V-shaped profile of upwardly facing bearing surface 54. This feature provides an effect equivalent to that of a non-linear spring introducing non-linear lateral stiffness. The radius of curvature of the damping insert's profile is chosen to be slightly large than the radius of roller 60, thereby introducing further non-linear stiffness to the system. Alternatively, the bearing surface itself could be machined to provided the smoothly curved transition zone.

Isolation bearing 50 compares favorably to a conventional friction pendulum bearing, in that it is able to provide the same long oscillation period in a smaller sized bearing. Generally speaking, better acceleration reduction is achieved with a longer period. Finally, with reference to FIG. 18, it will be understood that friction dampers 10 can be incorporated into isolation bearing 50 without use of corresponding containment frames by making use of the lower and upper bearing plates 52 and 56.

Figure 20:
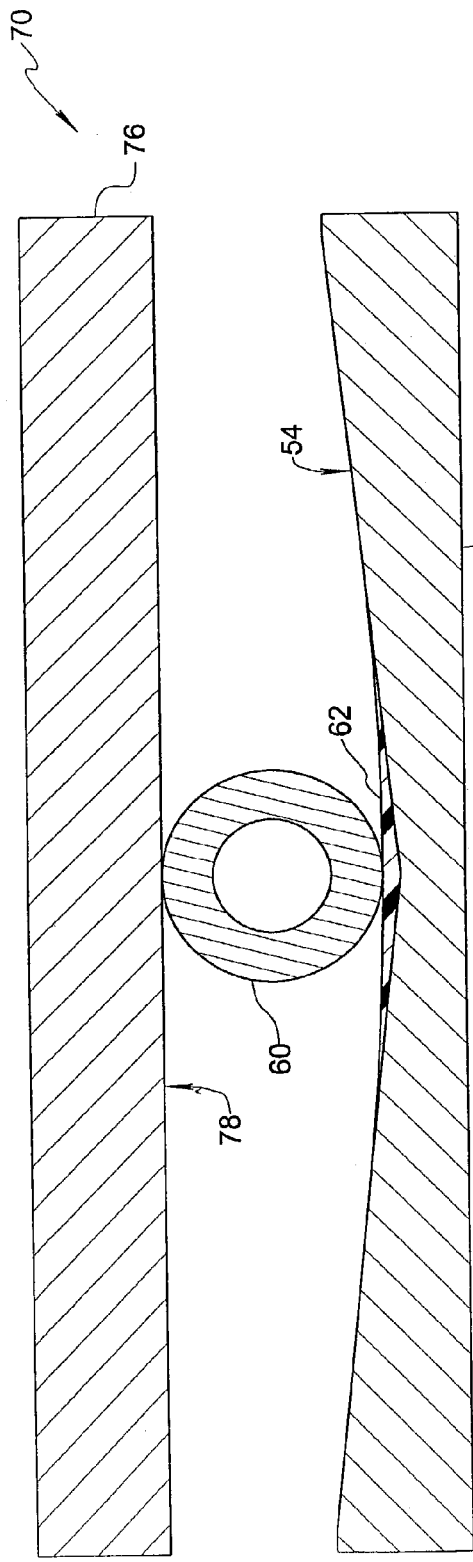
FIG. 20 is a view similar to that of FIG. 19, however showing an alternative bearing surface configuration.
Figure 21:
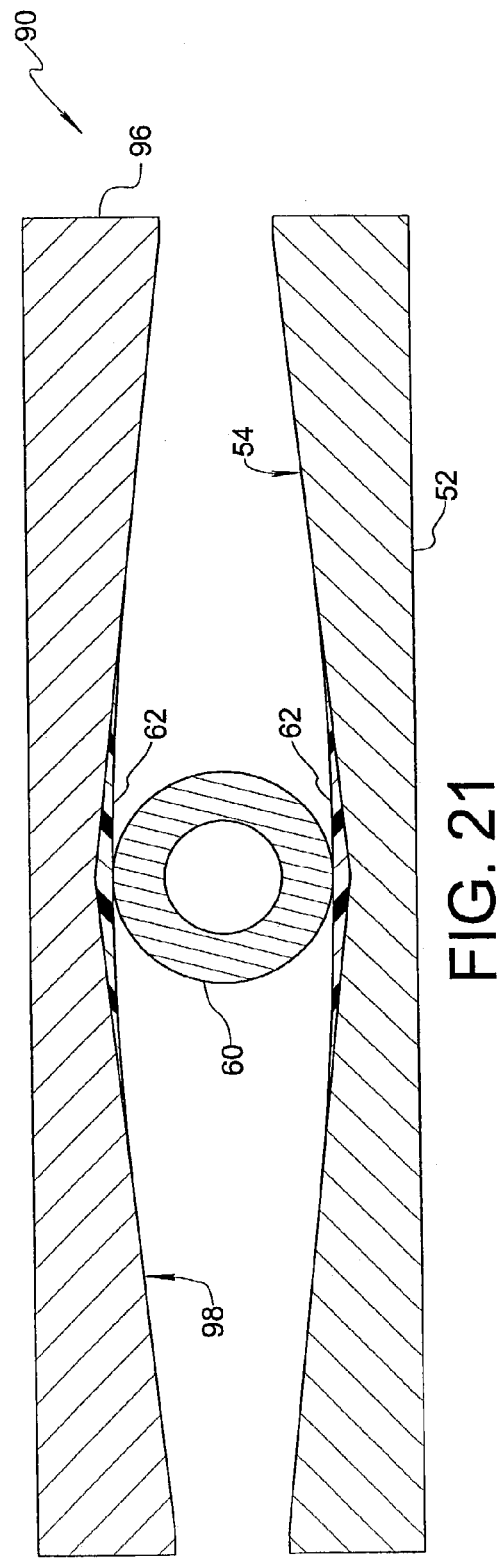
FIG. 21 is a view similar to that of FIG. 19, showing a further alternative bearing surface configuration.

FIGS. 20 and 21 depict other isolation bearing configurations of the present invention. FIG. 20 shows an isolation bearing 70 that has a lower plate 52 similar to that of isolation bearing 50 of FIGS. 18 and 19, and an upper plate 76 having a downwardly facing bearing surface 78 that is planar. Alternatively, lower plate 52 and upper plate 76 could be switched for one another. FIG. 21 shows an isolation bearing 90 that has a lower plate 52 similar to that of isolation bearing 50 of FIGS. 18 and 19, and an upper plate 96 having a downwardly facing bearing surface 98 of generally inverted V-shaped profile. A corresponding damping insert 62 defining a smoothly curved transition zone is preferably provided in similar but inverted fashion.

Referring to FIG. 20, when such an isolation bearing is used to protect large objects such as supercomputers from the effects of seismic energy, it is preferred that the entire bearing surfaces 54 and/or 78 be coated with a layer of the damping material such as the material that formed damping insert 62. Alternatively the outer surface of roller 60 may be coated with a layer of damping material, with or without the layer of damping material on bearing surfaces 54 and 78. the purpose of such layers of damping material is to eliminate or reduce vibrations generated in the system.

As will be appreciated from the foregoing description, the present invention is suitable for use in dissipating seismic energy to avoid damage to structures, however other applications are contemplated. For example, the present invention may find application in shipyards for docking freighters, or in train yards for halting rail cars. the compactness of the present damper also makes it possible to use such a device in situations where vibrations are to be reduced or eliminated, for example, when vehicles are transporting injured people.

What is claimed is:

1. A friction damper comprising:
   a rigid channel member including at least one elongated friction channel extending along a friction axis, said at least one friction channel having a cross-sectional shape transverse to said friction axis defined by a pair of internal sidewalls converging toward one another; and
   a rigid wedge member including a at least one friction wedge received by said at least one friction channel for sliding motion along said friction axis, said at least one friction wedge including a pair of external sidewalls movable into respective surface-to-surface engagement with said pair of internal sidewalls of said at least one friction channel by adjusting depth of receipt of said at least one friction wedge in said at least one friction channel in a direction normal to said friction axis.

2. The friction damper according to claim 1, further comprising biasing means for applying a normal force urging said at least one friction wedge deeper into said at least one friction channel.

3. The friction damper according to claim 2, wherein said normal force applied by said biasing means is adjustable.

4. The friction damper according to claim 1, wherein said at least one friction channel comprises a plurality of friction channels extending along parallel friction axes, and said at least one wedge member comprises a plurality of friction wedges respectively received by said plurality of friction channels.

5. The friction damper according to claim 1, wherein said channel member includes a first friction channel and a second friction channel, and said friction damper comprises a first wedge member having a friction wedge received by said first friction channel and a second wedge member having a friction wedge received by said second friction channel.

6. The friction damper according to claim 5, wherein said first friction channel extends along an X-axis direction and said second friction channel extends along another direction non-parallel to said X-axis direction.

7. The friction damper according to claim 6, wherein said another direction is a Y-axis direction orthogonal to said X-axis direction.

8. The friction damper according to claim 1, wherein said friction damper comprises first and second channel members each having a corresponding respective friction channel, and said wedge member includes a first friction wedge received by said friction channel of said first channel member and a second friction wedge received by said friction channel of said second channel member.

9. The friction damper according to claim 8, wherein said friction channel of said first channel member extends along an X-axis direction and said friction channel of said second channel member extends along a Y-axis direction orthogonal to said X-axis direction.

10. The friction damper according to claim 1, further comprising a plurality of shear keys for maintaining said pair of external sidewalls of said at least one friction wedge away from surface-to-surface engagement with said pair of internal sidewalls defining said at least one friction channel, wherein said plurality of shear keys is designed to fail under predetermined loading conditions on said friction damper.

* * * * *